US008655120B2

(12) United States Patent
Koka et al.

(10) Patent No.: US 8,655,120 B2
(45) Date of Patent: *Feb. 18, 2014

(54) ARBITRATED OPTICAL NETWORK USING TUNABLE DROP FILTERS

(75) Inventors: Pranay Koka, Austin, TX (US); Michael O. McCracken, Austin, TX (US); Herbert D. Schwetman, Jr., Austin, TX (US); Xuexhe Zheng, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 13/180,364

(22) Filed: Jul. 11, 2011

(65) Prior Publication Data

US 2013/0016941 A1 Jan. 17, 2013

(51) Int. Cl.
*G02B 6/12* (2006.01)

(52) U.S. Cl.
USPC .......................................................... 385/14

(58) Field of Classification Search
None
See application file for complete search history.

(56) References Cited

U.S. PATENT DOCUMENTS

| | | | |
|---|---|---|---|
| 4,535,330 A | 8/1985 | Carey et al. |
| 4,580,872 A | 4/1986 | Bhatt et al. |
| 4,809,264 A | 2/1989 | Abraham et al. |
| 5,541,914 A | 7/1996 | Krishnamoorthy et al. |
| 5,602,663 A | 2/1997 | Hamaguchi et al. |
| 5,742,585 A | 4/1998 | Yamamoto et al. |
| 5,943,150 A | 8/1999 | Deri et al. |
| 6,021,263 A | 2/2000 | Kujoory et al. |
| 6,289,021 B1 | 9/2001 | Hesse |
| 6,487,643 B1 | 11/2002 | Khare et al. |
| 6,618,379 B1 | 9/2003 | Ramamurthy et al. |
| 6,633,542 B1 | 10/2003 | Natanson et al. |
| 6,665,495 B1 | 12/2003 | Miles et al. |
| 6,873,796 B1 | 3/2005 | Nakahira |
| 6,910,088 B2 | 6/2005 | LaBerge |
| 7,403,473 B1 | 7/2008 | Mehrvar et al. |
| 7,804,504 B1 | 9/2010 | Agarwal |
| 7,957,381 B2 | 6/2011 | Clermidy et al. |
| 8,014,671 B1 | 9/2011 | Stevens |

(Continued)

OTHER PUBLICATIONS

Chae, Chang-Joon, "Optical CSMA/CD Media Access Scheme for Ethernet Over Passive Optical Network", IEEE, 2002.

(Continued)

*Primary Examiner* — Sung Pak
(74) *Attorney, Agent, or Firm* — Park, Vaughan, Fleming & Dowler LLP; Steven E. Stupp

(57) ABSTRACT

In a multi-chip module (MCM), integrated circuits are coupled by optical waveguides. These integrated circuits receive optical signals from a set of light sources which have fixed carrier wavelengths. Moreover, a given integrated circuit includes: a transmitter that modulates at least one of the optical signals when transmitting information to at least another of the integrated circuits; and a receiver that receives at least one modulated optical signal having one of the carrier wavelengths when receiving information from at least the other of the integrated circuits. Furthermore, the MCM includes tunable drop filters optically coupled to the optical waveguides and associated integrated circuits, wherein the tunable drop filters pass adjustable bands of wavelengths to receivers in the integrated circuits. Additionally, control logic in the MCM provides a control signal to the tunable drop filters to specify the adjustable bands of wavelengths.

20 Claims, 5 Drawing Sheets

(56) References Cited

U.S. PATENT DOCUMENTS

| | | |
|---|---|---|
| 2003/0214962 A1 | 11/2003 | Allaye-Chan et al. |
| 2004/0037558 A1 | 2/2004 | Beshai |
| 2005/0129055 A1 | 6/2005 | Hall et al. |
| 2006/0095634 A1 | 5/2006 | Meyer |
| 2009/0046572 A1 | 2/2009 | Leung |
| 2009/0168782 A1 | 7/2009 | Beshai |
| 2009/0169205 A1 | 7/2009 | Bergman et al. |
| 2010/0226308 A1 | 9/2010 | Haverty |
| 2010/0266276 A1* | 10/2010 | Zheng et al. ............. 398/43 |
| 2011/0103397 A1 | 5/2011 | Koka et al. |
| 2011/0103799 A1 | 5/2011 | Shacham et al. |
| 2011/0200332 A1 | 8/2011 | McCracken et al. |
| 2011/0200335 A1 | 8/2011 | Koka et al. |
| 2011/0206377 A1 | 8/2011 | Binkert et al. |
| 2013/0016970 A1* | 1/2013 | Koka et al. ............. 398/49 |
| 2013/0016980 A1* | 1/2013 | Koka et al. ............. 398/139 |

OTHER PUBLICATIONS

Desai, B.N., "An optical implementation of a packet-based (Ethernet) MAC in a WDM passive optical network overlay", 2000 Optical Society of America.

Krishnamoorthy, Ashok, "Computer Systems Based on Silicon Photonic Interconnects", Proceedings of the IEEE, vol. 97, No. 7, Jul. 2009.

Qin, Xiangdong, "Nonblocking WDM Switching Networks with Full and Limited Wavelength Conversion", 2002 IEEE.

Shacham, Assaf, "On the Design of a Photonic Network-on-Chip", Proceedings of the First International Symposium on Networks-on-Chip, 2007, IEEE.

Vantrease, Dana, "Corona: System Implications of Emerging Nanophotonic Technology", 2008, IEEE.

Wang, Howard, "Nanophotonic Optical Interconnection Network Architecture for On-Chip and Off-Chip Communications", OFC/NFOEC 2008.

Yang, Yuanyuan, "Designing WDM Optical Interconnects with Full Connectivity by Using Limited Wavelength Conversion", 2004 IEEE.

Battan, Christopher, "Building Manycore Processor-to-DRAM Networks with Monolithic Silicon Photonics", Proceedings of the 16th Symposium on High Performance Interconnects (HOT1-16), Aug. 2008.

"Round-Robin Scheduling", http://en.wikipedia.org/wiki/Round-robin_scheduling.

Terence D. Todd, "Photonic Multihop Bus Networks", 1991, IEEE, pp. 0981-0990.

Gilbert Hendry, "Silicon Nanophotonic Network-On-Chip Using TDM Arbitration".

\* cited by examiner

500

A CONTROL SIGNAL IS SELECTED BASED ON DESIRED COMMUNICATION BETWEEN AT LEAST A PAIR OF INTEGRATED CIRCUITS IN AN *MCM*
510

THE CONTROL SIGNAL IS PROVIDED TO TUNABLE DROP FILTERS, THEREBY SPECIFYING ADJUSTABLE BANDS OF WAVELENGTHS PASSED BY THE TUNABLE DROP FILTERS AND DEFINING ROUTING OF AT LEAST ONE OPTICAL SIGNAL IN AN *MCM* DURING COMMUNICATION BETWEEN AT LEAST THE PAIR OF THE INTEGRATED CIRCUITS
512

ARBITRATED OPTICAL NETWORK USING TUNABLE DROP FILTERS

GOVERNMENT LICENSE RIGHTS

This invention was made with Government support under Agreement No. HR0011-08-9-0001 awarded by DARPA. The Government has certain rights in the invention.

CROSS REFERENCE TO RELATED APPLICATIONS

This application is related to U.S. patent application Ser. No. 13/180,340, entitled "Optical Network With Tunable Optical Light Sources," by Pranay Koka, Michael O. McCracken, Herbert D. Schwetman, Jr., Xuezhe Zheng, and Ashok V. Krishnamoorthy, filed 11 Jul. 2011, and to U.S. patent application Ser. No. 13/180,355, entitled "Optical Network with Switchable Drop Filters," by Pranay Koka, Michael O. McCracken, Herbert D. Schwetman, Jr., Xuezhe Zheng, and Ashok V. Krishnamoorthy, filed Jun. 11, 2011 the contents of both of which are herein incorporated by reference.

BACKGROUND

1. Field

The present disclosure generally relates to optical networks. More specifically, the present disclosure relates to a multi-chip module (MCM) that includes integrated circuits that communicate via an optical network using statically tuned optical light sources and switchable drop filters.

2. Related Art

Wavelength division multiplexing (WDM), which allows a single optical link to carry multiple channels, can provide: very high bit-rates, very high bandwidth densities and very low power consumption. As a consequence, researchers are investigating the use of WDM to facilitate inter-chip communication. For example, in one proposed architecture chips (which are sometimes referred to as 'sites') in an array (which is sometimes referred to as an MCM or a 'macrochip') are coupled together by an optical network that includes optical interconnects (such as silicon optical waveguides).

In order to use photonic technology in interconnect applications, an efficient design is needed for the optical network. In particular, the optical network typically needs to provide: a high total peak bandwidth; a high bandwidth for each logical connection between any two sites in the array; low arbitration and connection setup overheads; low power consumption; and bandwidth reconfigurability.

A variety of network topologies having different characteristics and contention scenarios have been proposed to address these challenges in interconnect applications. One existing network topology, a static WDM point-to-point optical network, is shown in FIG. 1. In this network topology, an array of integrated circuits or chips 0-3 (which are each located at a 'site' in the array) are coupled by silicon optical waveguides using two carrier wavelengths (represented by the solid and dotted arrows). Note that the optical network in FIG. 1 is a fully connected point-to-point optical network. In particular, each site has a dedicated channel to every other site. Channels to all the sites in a column of the array (which are conveyed by different carrier wavelengths output by non-tunable light sources) may be multiplexed using WDM onto a single waveguide that runs from the source site and visits each site in the column, where a wavelength-selective 'drop filter' redirects one of the multiplexed wavelengths to a destination site (in this case, the drop filters in row 1 pick off the first carrier wavelength, and the drop filters in row 2 pick off the second carrier wavelength, so the carrier wavelength is used for routing). As illustrated by the bold line, in FIG. 1 chip 0 communicates with chips 1 and 3.

A key property of this optical network is the lack of arbitration overhead, which allows low minimum latency and high peak utilization for uniform traffic patterns. Furthermore, this optical network uses no switching elements, which results in low optical power loss in the optical waveguides. However, the bandwidth in the optical waveguides is statically allocated, which constrains the available bandwidth between any two sites. For example, in a macrochip that includes 64 chips arranged in an 8×8 array, with a peak system bandwidth of 20 TB/s, a total transmit bandwidth of 320 GB/s and a total receive bandwidth of 320 GB/s for each site, the bandwidth between any two sites is 5 GB/s, because each site has 64 outgoing optical waveguides so that each optical waveguide only has $1/64^{th}$ of the total site bandwidth. This constraint can lead to low performance for workloads that heavily stress a subset of the optical waveguides.

Other proposed network topologies have attempted to address this problem at the cost of: additional power consumption (such as that associated with switches), optical signal loss, increased area, constraints on the total transmit and receive bandwidths, constraints on the optical waveguide density, latency associated with setting up switches, and/or arbitration overhead associated with shared resources (which can be a performance bottleneck for workloads consisting of short messages). To date, the tradeoffs between the improved site-to-site bandwidth and the costs in these other approaches do not successfully address the challenges in implementing optical networks in interconnect applications.

Hence, what is needed is an MCM with an optical network that does not suffer from the above-described problems.

SUMMARY

One embodiment of the present disclosure provides an MCM. This MCM includes integrated circuits that receive optical signals from a set of light sources which have fixed carrier wavelengths. A given integrated circuit includes: a transmitter that modulates at least one of the optical signals when transmitting information to at least another of the integrated circuits; and a receiver that receives at least one modulated optical signal having one of the carrier wavelengths when receiving information from at least the other of the integrated circuits. Moreover, the MCM includes first optical waveguides, optically coupled to the integrated circuits, that convey modulated optical signals from transmitters in the integrated circuits, and second optical waveguides, optically coupled to the first optical waveguides, that convey the modulated optical signals. Furthermore, the MCM includes tunable drop filters optically coupled to the second optical waveguides and associated integrated circuits, where the tunable drop filters are configured to pass adjustable bands of wavelengths to receivers in the integrated circuits, and where a given adjustable band of wavelengths of a given tunable drop filter associated with the given integrated circuit includes one of the carrier wavelengths. Additionally, the MCM includes control logic that provides a control signal to the tunable drop filters to specify the adjustable bands of wavelengths, thereby defining routing of at least the one of the optical signals in the MCM during communication between at least a pair of the integrated circuits.

Note that the integrated circuits may be arranged in an array. The first optical waveguides may be optically coupled to rows in the array (or, more generally, a first direction in the array), and the second optical waveguides may be optically coupled to columns in the array (or, more generally, a second direction in the array).

Moreover, the first optical waveguides and the second optical waveguides may be implemented in different layers on a substrate, and the MCM may include interlayer couplers that optically couple the first optical waveguides and the second optical waveguides. For example, the first optical waveguides and the second optical waveguides may be implemented on the substrate using silicon-on-insulator technology.

Furthermore, the integrated circuits in a given column may transmit modulated optical signals having the same carrier wavelength, while integrated circuits in a given row may transmit modulated optical signals having different carrier wavelengths.

Note that the control signal may specify a number of tunable drop filters associated with the given integrated circuit that have adjustable bands of wavelengths that include carrier wavelengths, thereby specifying a bandwidth during communication between at least the pair of the integrated circuits.

In some embodiments, communication between the pair of integrated circuits involves an arbitration technique so that only optical signals having a given carrier wavelength, which are communicated between the pair of integrated circuits, are conveyed on a given first optical waveguide and a given second optical waveguide at a given time.

Another embodiment provides a system that includes: the set of light sources that output optical signals having fixed carrier wavelengths; and the MCM.

Another embodiment provides a method for routing optical signals in the MCM. During the method, a control signal is selected based on desired communication between at least the pair of integrated circuits in the MCM, which are optically coupled by optical waveguides, where the given integrated circuit modulates at least one of the optical signals having carrier wavelengths when transmitting information to at least another of the integrated circuits, and receives at least one modulated optical signal having one of the carrier wavelengths when receiving information from at least the other of the integrated circuits. Then, the control signal is provided to tunable drop filters optically coupled to the optical waveguides and associated integrated circuits, thereby specifying adjustable bands of wavelengths passed by the tunable drop filters and defining routing of at least the one of the optical signals in the MCM during communication between at least a pair of the integrated circuits. Note that the tunable drop filters pass adjustable bands of wavelengths to receivers in the integrated circuits, where a given adjustable band of wavelengths of a given tunable drop filter includes one of the carrier wavelengths.

In some embodiments, communication between the pair of integrated circuits involves an arbitration technique so that only optical signals having a given carrier wavelength, which are communicated between the pair of integrated circuits, are conveyed on a given first optical waveguide and a given second optical waveguide at a given time.

BRIEF DESCRIPTION OF THE FIGURES

FIG. 5 is a flow chart illustrating a method for routing optical signals in an MCM in accordance with an embodiment of the present disclosure.

Figure 1:
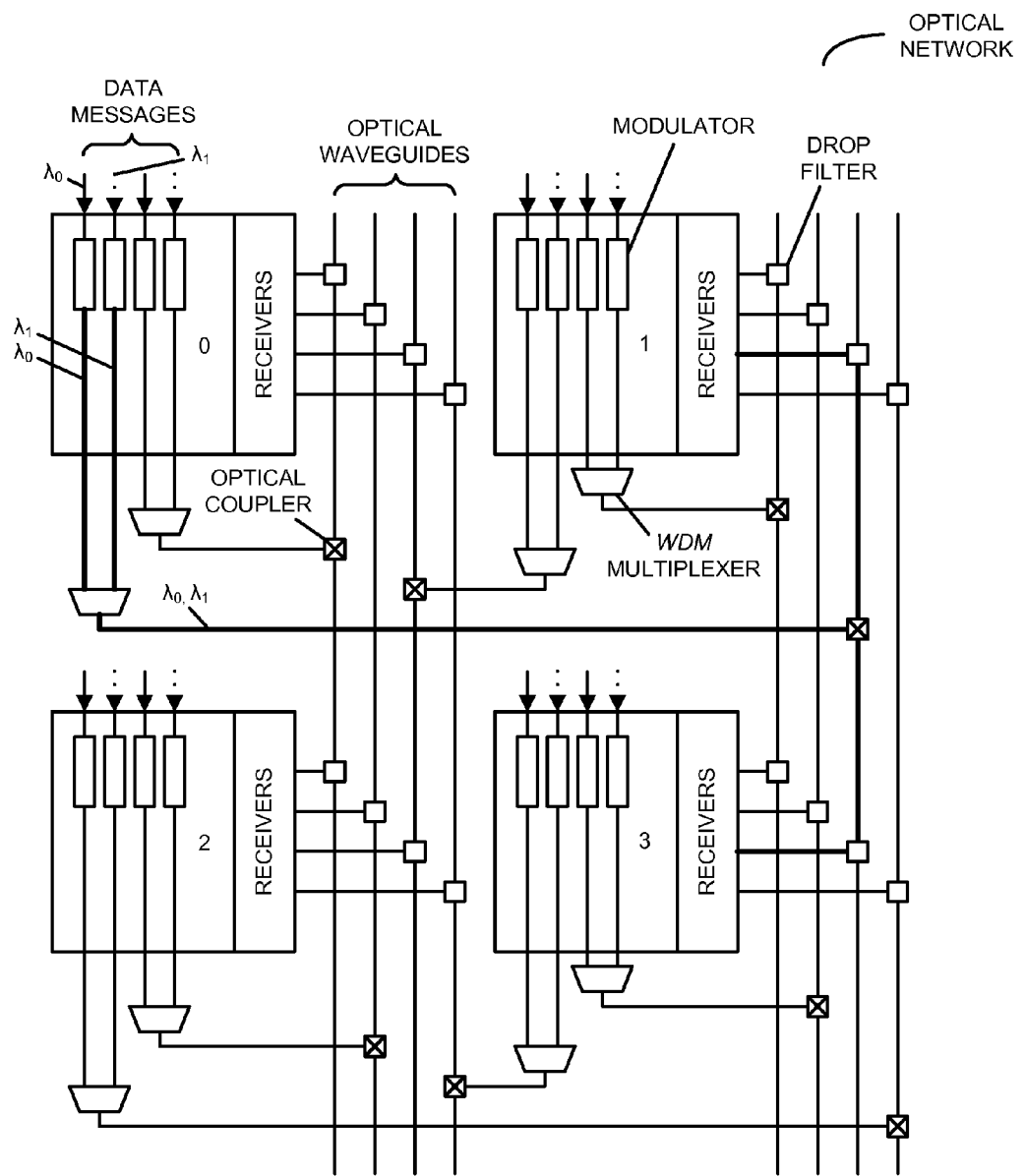
FIG. 1 is a block diagram illustrating an existing static point-to-point optical network.

Table 1 provides configuration information in an embodiment of an optical network in an MCM.

Note that like reference numerals refer to corresponding parts throughout the drawings. Moreover, multiple instances of the same part are designated by a common prefix separated from an instance number by a dash.

DETAILED DESCRIPTION

Embodiments of an MCM, a system that includes the MCM, and a method for routing optical signals in the MCM are described. In this MCM, integrated circuits are coupled by optical waveguides. These integrated circuits receive optical signals from a set of light sources which have fixed carrier wavelengths. Moreover, a given integrated circuit includes: a transmitter that modulates at least one of the optical signals when transmitting information to at least another of the integrated circuits; and a receiver that receives at least one modulated optical signal having one of the carrier wavelengths when receiving information from at least the other of the integrated circuits. Furthermore, the MCM includes tunable drop filters optically coupled to the optical waveguides and associated integrated circuits, wherein the tunable drop filters pass adjustable bands of wavelengths to receivers in the integrated circuits. Additionally, control logic in the MCM provides a control signal to the tunable drop filters to specify the adjustable bands of wavelengths, thereby defining routing of at least the one of the optical signals in the MCM during communication between at least a pair of the integrated circuits.

The optical network in the MCM provides a high, dynamically configurable, site-to-site bandwidth. To avoid or resolve contention among communicating integrated circuits, access to the optical network may be regulated using an arbitration technique. This optical network has a suitable balance of high bandwidth, a reduced number of components and latency for use in interconnect applications.

Figure 2:
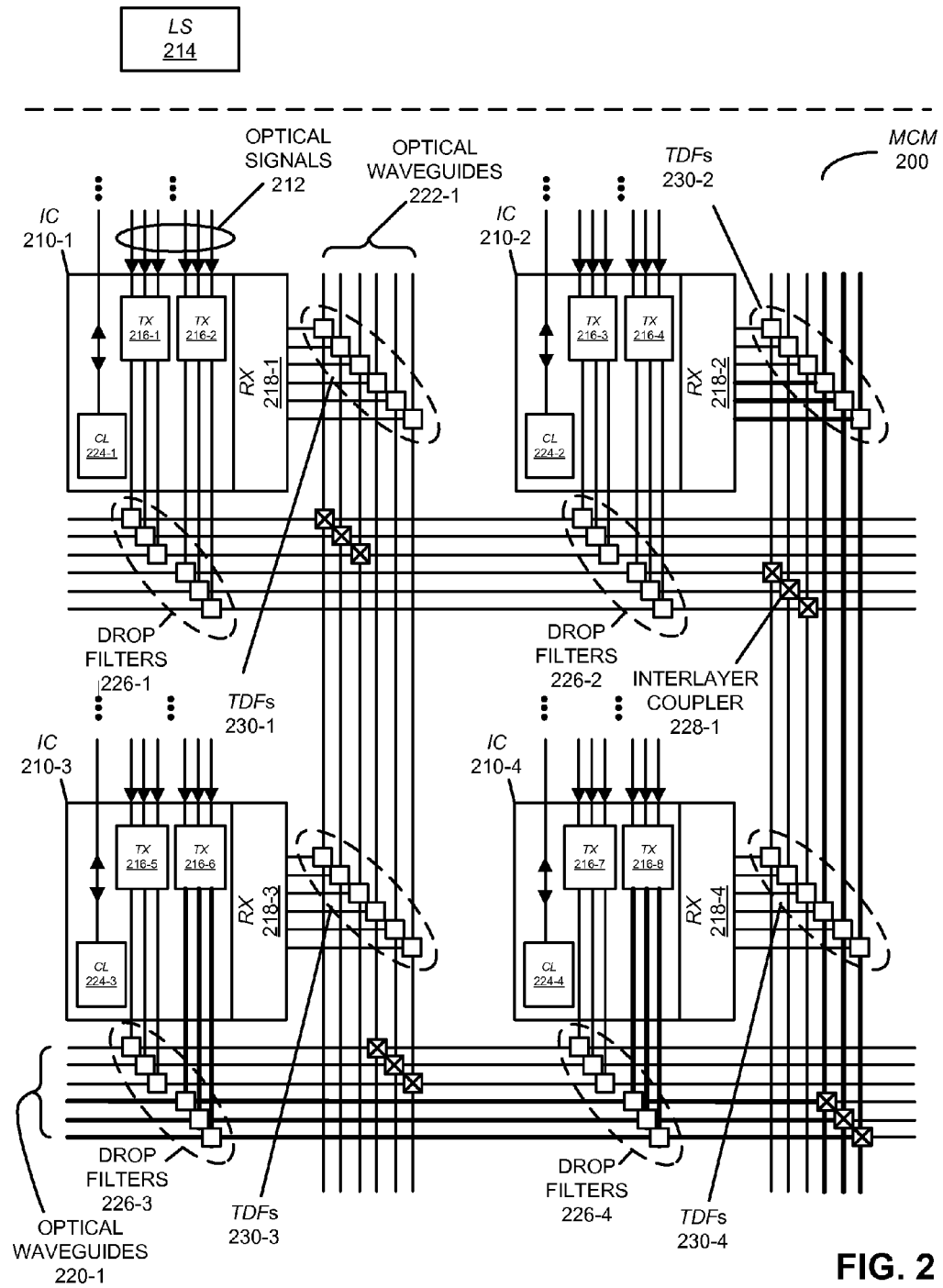
FIG. 2 is a block diagram illustrating optical communication in an MCM in accordance with an embodiment of the present disclosure.

We now describe embodiments of the MCM. FIG. 2 presents a block diagram illustrating optical communication in MCM 200 (which is sometimes referred to as a 'macrochip'). This MCM provides a network that uses optical signals having fixed carrier wavelengths (which are provided by statically tuned lasers) at the source and tunable drop filters at the destination (instead of switches) to route optical signals. Because of the use of shared optical waveguides among multiple destinations, the optical network in MCM 200 has a network topology with fewer parallel transfers that can be dynamically reconfigured to increase the site-to-site bandwidth.

In particular, MCM 200 includes integrated circuits (ICs) 210 (such as processors and/or memory chips) that receive optical signals 212 from a set of statically tuned light sources (LS) 214 (such as statically tuned lasers that output optical signals having fixed carrier wavelengths). This set of statically tuned light sources may be external to MCM 200 (as indicated by the dashed line), and may be optically coupled to MCM 200 by optical fiber(s). In this discussion, a statically tuned laser is a light source that outputs particular fixed wavelength(s) in the usable spectrum. A given integrated circuit in MCM 200 (such as integrated circuit 210-1) includes: a transmitter, such as transmitter (TX) 216-1, that modulates at least one of optical signals 212 when transmitting information to at least another of integrated circuits 210; and a receiver, such as receiver (RX) 218-1, that receives at least one modulated optical signal having one of the carrier wavelengths when receiving information from at least the other of integrated circuits 210.

Moreover, MCM 200 includes optical waveguides (such as optical waveguides 220-1), optically coupled to the integrated circuits 210 by static WDM drop filters 226, that convey modulated optical signals from transmitters 216 in integrated circuits 210; and optical waveguides (such as optical waveguides 222-1), optically coupled to the other optical waveguides, that convey the modulated optical signals to tunable drop filters 230 or TDFs (which may include tunable add/drop filters). These tunable drop filters pass adjustable bands of wavelengths to receivers 218 in integrated circuits 210. In particular, a given adjustable band of wavelengths of a given tunable drop filter associated with the given integrated circuit includes one of the carrier wavelengths. (Thus, a tunable drop filter can be dynamically tuned to any carrier wavelength in the usable spectrum. It will then act exactly as a static drop filter would if tuned for that carrier wavelength.) Aside from minor power loss, a tunable drop filter does not interfere with other carrier wavelengths outside of the adjustable band of wavelengths.

Additionally, MCM 200 includes control logic 224 that provides one or more control signals to tunable drop filters 230 to specify the adjustable bands of wavelengths, thereby defining routing of at least the one of optical signals 212 in MCM 200 during communication between at least a pair of integrated circuits 210. In general, control logic 224 may be centralized or distributed in MCM 200. Note that the control signal may specify a number of tunable drop filters associated with the given integrated circuit that have adjustable bands of wavelengths that include carrier wavelengths, thereby specifying a bandwidth during communication between at least the pair of the integrated circuits.

In addition, because communication between the pair of integrated circuits or sites in MCM 200 may involve contention, this communication may involve an arbitration technique so that only optical signals having a given carrier wavelength, which are communicated between the pair of integrated circuits, are conveyed on a given horizontal optical waveguide and a given vertical optical waveguide at a given time. For example, control logic 224 may implement the arbitration technique. The design of the arbitration technique is known to one of skill in the art.

As shown in FIG. 2, integrated circuits 210 may be arranged in an array. Some of the optical waveguides (such as optical waveguides 220-1) may be optically coupled to rows in the array (or, more generally, a first direction in the array), and the other optical waveguides (such as optical waveguides 222-1) may be optically coupled to columns in the array (or, more generally, a second direction in the array). Furthermore, in integrated circuits 210, the optical waveguides in the different directions may be physically separate components. For example, optical waveguides 220-1 and optical waveguides 222-1 may be implemented in different layers on a substrate (which eliminates waveguide crossings that can cause power loss and cross-talk problems), and MCM 200 may include interlayer couplers, such as interlayer coupler 228-1 (for example, an optical proximity connector) that optically couples the optical waveguides. Note that an interlayer coupler may transfer an optical signal in an optical waveguide in a layer to an optical waveguide in another layer that is vertically above or below the layer. Furthermore, in MCM 200 each horizontal optical waveguide is coupled to exactly one vertical optical waveguide.

The optical waveguides may be implemented in a semiconductor layer on the substrate, and the optical signals or light in these optical waveguides may be highly confined because of the big difference between the index of refraction of the semiconductor layer and the surrounding material. While a wide variety of materials can be used in the semiconductor layer, in an exemplary embodiment silicon is used. Furthermore, this silicon semiconductor layer may be disposed on a buried-oxide layer which, in turn, is disposed on the substrate. Once again, a wide variety of materials may be used in the substrate, such as a semiconductor, glass or plastic. In an exemplary embodiment, silicon is used in the substrate, along with silicon dioxide in the buried-oxide layer. Consequently, in some embodiments, the substrate, the buried-oxide layer and the semiconductor layer may comprise a silicon-on-insulator (SOI) technology.

In an exemplary embodiment, the optical waveguides convey optical signals (i.e., light) having wavelengths between 1.1-1.7 µm, such as an optical signal having a fundamental wavelength of 1.3 or 1.55 µm. These optical waveguides may have thicknesses between 0.25 and 3 µm, and widths between 0.5 and 3 µm. Note that because the optical waveguides may have quasi-rectangular cross-sections, they may be quasi-single mode components. Moreover, the buried-oxide layer may have a thickness between 0.3 and 3 µm.

In an exemplary embodiment, a 3×3 array of integrated circuits 210 is used. Each of the optical waveguides carries three carrier wavelengths. Moreover, a given integrated circuit transmits modulated optical signals having a given carrier wavelength. In some embodiments, the integrated circuits in a given column may transmit modulated optical signals having the same carrier wavelength in a horizontal optical waveguide, while integrated circuits in a given row may transmit modulated optical signals having different carrier wavelengths.

Because of the nature of silicon photonics, no more than one source integrated circuit can connect directly to an optical waveguide to transmit a given carrier wavelength. To overcome this limitation, there may be a static drop filter at each connection point, between a horizontal optical waveguide and an integrated circuit. Each of these static drop filters is statically tuned to a corresponding carrier wavelength, and only passes a narrow band of wavelengths that includes this carrier wavelength. In this way, each integrated circuit can transmit data using a carrier wavelength without colliding with different carrier wavelengths used by the other integrated circuit on a row.

At the receiving end, each integrated circuit may be restricted to receive only one carrier wavelength from one vertical optical waveguide at any given time. This constraint may limit the receiver count at each integrated circuit. Furthermore, tunable drop filters are associated with corresponding receivers. A tunable drop filter passes only one carrier wavelength but is tunable across the spectrum of carrier wavelengths carried by a vertical optical waveguide. This enables the destination to receive any given carrier wavelength from a vertical optical waveguide at any given time.

Because a receiver can receive data from only one integrated circuit on any one vertical optical waveguide, an arbitration and receiver notification mechanism (which is sometimes referred to as an 'arbitration technique') may be used. For example, the arbitration technique may include time-domain multiplexing and/or two-phase arbitration.

During operation, a transmitting integrated circuit may perform the following operations to send data to a receiving integrated circuit. Using the arbitration technique, the sending integrated circuit may arbitrate with the other integrated circuits in the row for access to the desired carrier-wavelength channels at the receiving integrated circuit. This arbitration technique may notify the receiving integrated circuit of the carrier wavelength in the next data transmission.

Then, before the assigned data slot is used, the destination integrated circuit tunes its tunable drop filter to the carrier wavelength of the next transmitting integrated circuit. (Because a tunable drop filter may be swept across all the carrier wavelengths in an optical waveguide when it is tuned, it can destroy an optical signal. Therefore, there may be a dark period during tuning Note that dark periods affect the network performance, so time intervals in the optical network may be coarse.) After this operation is completed, the sending integrated circuit begins data transmission.

In some embodiments integrated circuits may communicate with other integrated circuits using two simultaneous data streams that are conveyed using the same set of optical waveguides. For example, in a 3×3 array with up to three carrier wavelengths on a given optical waveguide, an integrated circuit at site 1 may transmit to an integrated circuit at site 9, and an integrated circuit at site 2 may transmit to an integrated circuit at site 3 using the same set of optical waveguides. In order to receive these transmissions, sites 3 and 9 may, respectively, tune their associated tunable drop filters to the appropriate carrier wavelengths (such as a 'red' wavelength and a 'green' wavelength).

In another example with a 3×3 array, a site can use one-third of the bandwidth to communicate with a given column, and can be configured to communicate all of this one-third of the bandwidth with one site or as little as one-ninth of the bandwidth with the sites on the column. Thus, site 1 can communicate with sites 3, 6 and 9 at the same time.

Note that, if site 1 communicates with site 9, sites 2 and 3 cannot use those optical waveguides to communicate with site 9. Consequently, sites 1, 2 and 3 typically have to agree on access in advance using an arbitration technique, thereby avoiding conflicts. Moreover, information used in this arbitration technique may be conveyed using the optical waveguides or a separate optical network. While arbitration can result in delays, it may allow the number of components in the optical network to be reduced.

If the 2×2 array in FIG. 2 is scaled to an 8×8 array, and assuming that a WDM factor of eight is used (i.e., each optical waveguide carries eight carrier wavelengths), each tunable drop filter may be tunable across eight carrier wavelengths. Moreover, each row may have 16 optical waveguides to each column, and each site in a row can transmit in one carrier wavelength in each of the 16 optical waveguides. If each carrier wavelength has a bit-rate of 20 Gb/s (or 2.5 GB/s), the outgoing bandwidth is 320 GB/s per site and the site-to-site link bandwidth is 40 GB/s.

Table 1 provides configuration information in an embodiment of an optical network in an MCM with an 8×8 array. Note that because the light sources are statically tuned, they can output multiple carrier wavelengths at a given time. Moreover, because more than one carrier wavelength can be conveyed in a given optical waveguide, the number of optical waveguides is reduced relative to many other WDM optical networks. Furthermore, the reconfigurable bandwidth in communication between integrated circuits in the optical network can vary from one to N carrier wavelengths in an N×N macrochip, and can vary on a per-message basis.

TABLE 1

| | |
|---|---|
| Horizontal Optical Waveguides | 2048 |
| Vertical Optical Waveguides | 2048 |
| Transmitters | 8192 |
| Receivers | 8192 |
| Drop Filters | 8192 |
| Switchable Drop Filters | 0 |
| Tunable Drop Filters | 8192 |
| Arbitration? | Yes |
| Bounded Clock Skew? | No |
| Dark Periods for Tuning? | Yes |
| Feedback to Tunable Light Sources? | No |
| Bandwidth Reconfigurability | Suitable for large grained reconfigurability |
| Relative Optical Link Power Loss | Maximum |
| Per Packet Overhead | Need for arbitration results in higher per-packet overhead |
| Relative Area Overhead | Minimum |

In summary, MCM 200 includes an optical network with statically tuned light sources (such as lasers that output a set of fixed carrier wavelengths) and without broadband switches or a global clock. This optical network has: low overhead, low power, high site-to-site bandwidth, and flexible allocation of bandwidth between an integrated circuit and all the integrated circuits in a destination column. The overall complexity of the network topology is not significantly increased relative to existing network topographies, such as a WDM point-to-point optical network. Note that, because the network may involve contention, an arbitration technique may be used to resolve contention among transmitting integrated circuits. While a separate control network may be used to control the tunable drop filters, in some embodiments the control signal(s) are conveyed to the integrated circuits using the same optical waveguides that convey data. Moreover, because the bandwidth along each shared data channel can be dynamically allocated (at carrier-wavelength granularity) between the destination integrated circuits, the network is very flexible and can be adapted to different types of applications. Furthermore, because the network avoids crossings of the optical waveguides, it may be power efficient and may have reduced crosstalk. Additionally, because the network does not require communication with the set of optical sources, the overhead for sending messages may be reduced.

Figure 3:
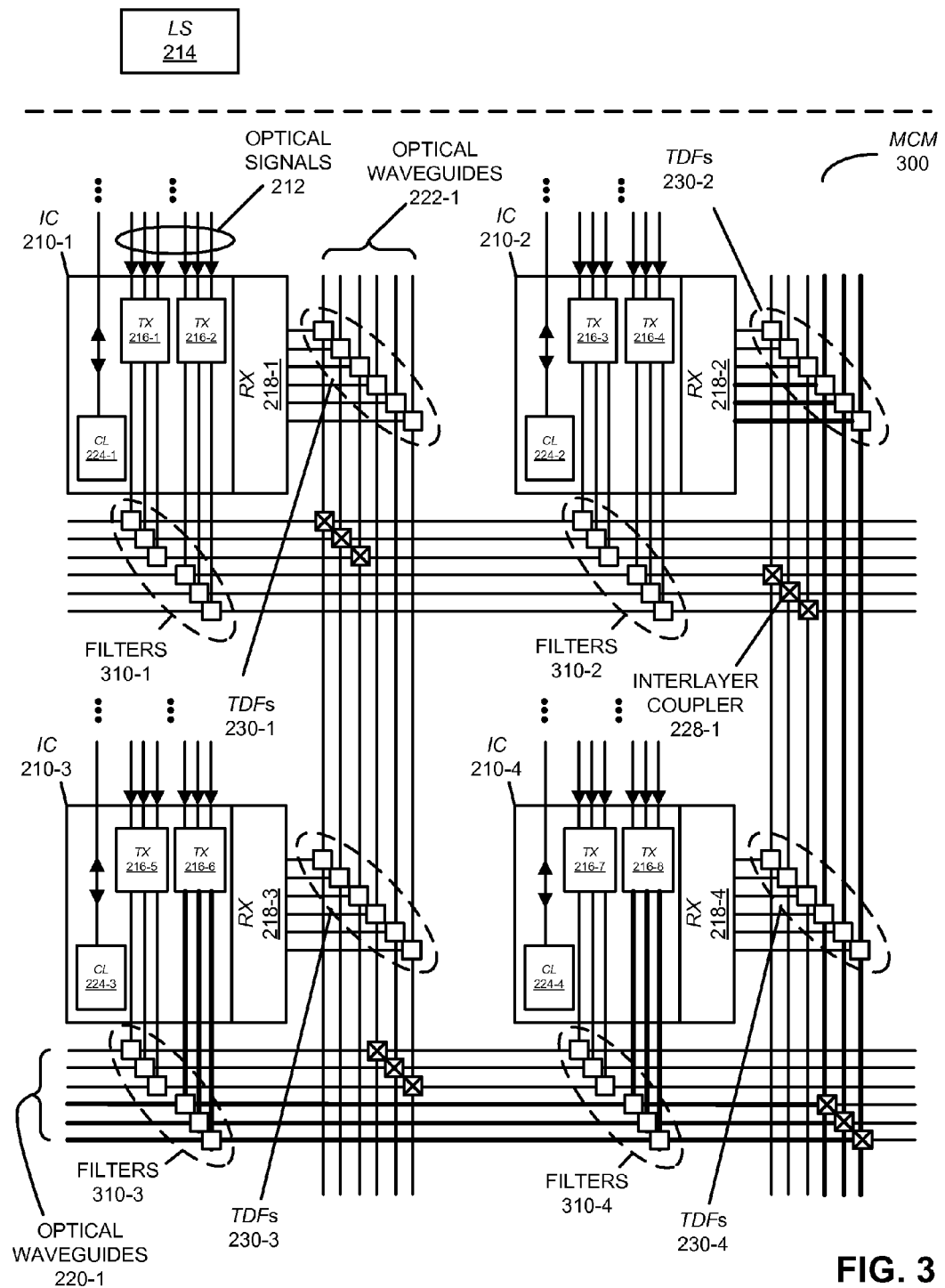
FIG. 3 is a block diagram illustrating optical communication in an MCM in accordance with an embodiment of the present disclosure.

In a variation on the optical network in FIG. 2, the MCM may include: tunable drop filters and/or switchable filters optically coupled to the horizontal optical waveguides and the given integrated circuit. This is shown in FIG. 3, which presents a block diagram illustrating optical communication in MCM 300. In particular, MCM 300 includes filters (such as filter 310-1), which may be tunable drop filters and/or switchable filters. Note that a switchable drop filter passes an adjustable band of wavelengths that includes at least one of: a given carrier wavelength and another wavelength (such as an unused wavelength). Moreover, the adjustable bands of wavelengths of the filters may be specified by the control signal provided by control logic 224.

Figure 4:
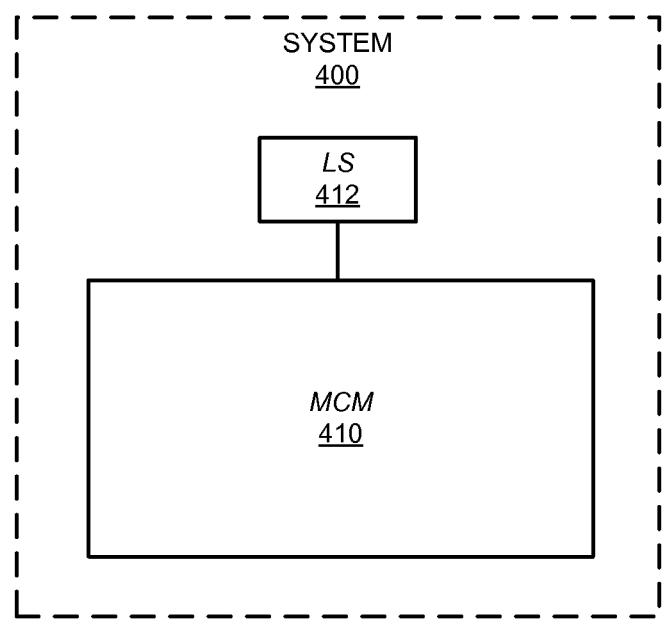
FIG. 4 is a block diagram illustrating a system that includes an MCM in accordance with an embodiment of the present disclosure.

The preceding embodiments of the MCM may be used in a variety of applications. This is shown in FIG. 4, which presents a block diagram illustrating a system 400 that includes an MCM 410 and set of set of statically tuned light sources 412. This set of tunable light sources outputs optical signals having fixed carrier wavelengths.

System 400 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device (such as a tablet computer), a supercomputer, a network-attached-storage (NAS) system, a storage-area-network (SAN) system, and/or another electronic computing device. Note that a given computer system may be at one location or may be distributed over multiple, geographically dispersed locations.

The preceding embodiments of the MCM, as well as system 400, may include fewer components or additional components. Although these embodiments are illustrated as having a number of discrete items, these MCMs and the system are intended to be functional descriptions of the various features that may be present rather than structural schematics of the embodiments described herein. Consequently, in these embodiments two or more components may be combined into a single component, and/or a position of one or more components may be changed. For example, the light sources or lasers may be included on the MCM. In addition, functionality in the preceding embodiments of the MCMs and the system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with particular components, configurations and network architectures, a wide variety of additional variations to the optical network in the embodiments of the MCM may be used, as is known to one of skill in the art, including: the use of additional or fewer components, arbitration techniques (as needed), etc.

We now describe embodiments of a method for routing optical signals. FIG. 5 presents a flow chart illustrating a method 500 for routing optical signals in an MCM, such as one of the preceding embodiments of the MCM. During the method, a control signal is selected based on desired communication between at least the pair of integrated circuits in the MCM (operation 510), which are optically coupled by optical waveguides, where the given integrated circuit modulates at least one of the optical signals when transmitting information to at least another of the integrated circuits and receives at least one modulated optical signal having one of the carrier wavelengths when receiving information from at least the other of the integrated circuits. Then, the control signal is provided to tunable drop filters optically coupled to the optical waveguides and associated integrated circuits (operation 512), thereby specifying adjustable bands of wavelengths passed by the tunable drop filters and defining routing of at least the one of the optical signals in the MCM during communication between at least a pair of the integrated circuits. Note that the tunable drop filters pass adjustable bands of wavelengths to receivers in the integrated circuits, where a given adjustable band of wavelengths of a given tunable drop filter includes one of the carrier wavelengths.

In some embodiments of method 500, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A multi-chip module (MCM), comprising:
integrated circuits configured to receive optical signals from a set of light sources, which have fixed carrier wavelengths, wherein a given integrated circuit includes:
 a transmitter configured to modulate at least one of the optical signals when transmitting information to at least another of the integrated circuits; and
 a receiver configured to receive at least one modulated optical signal having one of the carrier wavelengths when receiving information from at least the other of the integrated circuits;
first optical waveguides, optically coupled to the integrated circuits, to convey modulated optical signals from transmitters in the integrated circuits;
second optical waveguides, optically coupled to the first optical waveguides, to convey the modulated optical signals;
tunable drop filters optically coupled to the second optical waveguides and associated integrated circuit, wherein the tunable drop filters are configured to pass adjustable bands of wavelengths to receivers in the integrated circuits, and wherein a given adjustable band of wavelengths of a given tunable drop filter associated with the given integrated circuit includes one of the carrier wavelengths; and
control logic configured to provide a control signal to the tunable drop filters to specify the adjustable bands of wavelengths, thereby defining routing of at least the one of the optical signals in the MCM during communication between at least a pair of the integrated circuits.

2. The MCM of claim 1, wherein the integrated circuits are arranged in an array;
wherein the first optical waveguides are optically coupled to rows in the array; and
wherein the second optical waveguides are optically coupled to columns in the array.

3. The MCM of claim 2, wherein the integrated circuits in a given column transmit modulated optical signals having the same carrier wavelength, while integrated circuits in a given row transmit modulated optical signals having different carrier wavelengths.

4. The MCM of claim 1, wherein the first optical waveguides and the second optical waveguides are implemented in different layers on a substrate; and
wherein the MCM further includes interlayer couplers that optically couple the first optical waveguides and the second optical waveguides.

5. The MCM of claim 4, wherein the first optical waveguides and the second optical waveguides are implemented on the substrate using silicon-on-insulator technology.

6. The MCM of claim 1, wherein the control signal specifies a number of tunable drop filters associated with the given integrated circuit that have adjustable bands of wavelengths that include carrier wavelengths, thereby specifying a bandwidth during communication between at least the pair of the integrated circuits.

7. The MCM of claim 1, wherein communication between the pair of integrated circuits involves an arbitration technique so that only optical signals having a given carrier wavelength, which are communicated between the pair of integrated circuits, are conveyed on a given first optical waveguide and a given second optical waveguide at a given time.

8. A system, comprising:
a set of light sources configured to output optical signals having fixed carrier wavelengths;
integrated circuits optically coupled to the set of light sources, wherein a given integrated circuit includes:
a transmitter configured to modulate at least one of the optical signals when transmitting information to at least another of the integrated circuits; and
a receiver configured to receive at least one modulated optical signal having one of the carrier wavelengths when receiving information from at least the other of the integrated circuits;
first optical waveguides, optically coupled to the integrated circuits, to convey modulated optical signals from transmitters in the integrated circuits;
second optical waveguides, optically coupled to the first optical waveguides, to convey the modulated optical signals;
tunable drop filters optically coupled to the second optical waveguides and associated integrated circuit, wherein the tunable drop filters are configured to pass adjustable bands of wavelengths to receivers in the integrated circuits, and wherein a given adjustable band of wavelengths of a given tunable drop filter associated with the given integrated circuit includes one of the carrier wavelengths; and
control logic configured to provide a control signal to the tunable drop filters to specify the adjustable bands of wavelengths, thereby defining routing of at least the one of the optical signals in the system during communication between at least a pair of the integrated circuits.

9. The system of claim 8, wherein the integrated circuits are arranged in an array;
wherein the first optical waveguides are optically coupled to rows in the array; and
wherein the second optical waveguides are optically coupled to columns in the array.

10. The system of claim 9, wherein the integrated circuits in a given column transmit modulated optical signals having the same carrier wavelength, while integrated circuits in a given row transmit modulated optical signals having different carrier wavelengths.

11. The system of claim 8, wherein the first optical waveguides and the second optical waveguides are implemented in different layers on a substrate; and
wherein the system further includes interlayer couplers that optically couple the first optical waveguides and the second optical waveguides.

12. The system of claim 11, wherein the first optical waveguides and the second optical waveguides are implemented on the substrate using silicon-on-insulator technology.

13. The system of claim 8, wherein the control signal specifies a number of tunable drop filters associated with the given integrated circuit that have adjustable bands of wavelengths that include carrier wavelengths, thereby specifying a bandwidth during communication between at least the pair of the integrated circuits.

14. The system of claim 8, wherein communication between the pair of integrated circuits involves an arbitration technique so that only optical signals having a given carrier wavelength, which are communicated between the pair of integrated circuits, are conveyed on a given first optical waveguide and a given second optical waveguide at a given time.

15. A method for routing optical signals in an MCM, the method comprising:
selecting a control signal based on desired communication between at least a pair of integrated circuits in the MCM, which are optically coupled by optical waveguides, wherein a given integrated circuit modulates at least one of optical signals having carrier wavelengths when transmitting information to at least another of the integrated circuits, and receives at least one modulated optical signal having one of the carrier wavelengths when receiving information from at least the other of the integrated circuits; and
providing the control signal to tunable drop filters optically coupled to the optical waveguides and associated integrated circuits, thereby specifying adjustable bands of wavelengths passed by the tunable drop filters and defining routing of at least the one of the optical signals in the MCM during communication between at least a pair of the integrated circuits,
wherein the tunable drop filters are configured to pass adjustable bands of wavelengths to receivers in the integrated circuits, and
wherein a given adjustable band of wavelengths of a given tunable drop filter includes one of the carrier wavelengths.

16. The method of claim 15, wherein communication between the pair of integrated circuits involves an arbitration technique so that only optical signals having a given carrier wavelength, which are communicated between the pair of integrated circuits, are conveyed on a given first optical waveguide and a given second optical waveguide at a given time.

17. The method of claim 15, wherein the integrated circuits are arranged in an array;
wherein first optical waveguides are optically coupled to rows in the array; and
wherein second optical waveguides are optically coupled to columns in the array.

18. The method of claim 17, wherein the integrated circuits in a given column transmit modulated optical signals having the same carrier wavelength, while integrated circuits in a given row transmit modulated optical signals having different carrier wavelengths.

19. The method of claim 17, wherein the first optical waveguides and the second optical waveguides are implemented in different layers on a substrate; and
wherein interlayer couplers optically couple the first optical waveguides and the second optical waveguides.

20. The method of claim 15, wherein the control signal specifies a number of tunable drop filters associated with the given integrated circuit that have adjustable bands of wavelengths that include carrier wavelengths, thereby specifying a bandwidth during communication between at least the pair of the integrated circuits.

* * * * *

UNITED STATES PATENT AND TRADEMARK OFFICE
CERTIFICATE OF CORRECTION

| | | |
|---|---|---|
| PATENT NO. | : 8,655,120 B2 | Page 1 of 1 |
| APPLICATION NO. | : 13/180364 | |
| DATED | : February 18, 2014 | |
| INVENTOR(S) | : Praney Koka et al. | |

It is certified that error appears in the above-identified patent and that said Letters Patent is hereby corrected as shown below:

On the title page, Item (75), please replace the fourth inventor's name "Xuexhe Zheng" with --Xuezhe Zheng--.

Signed and Sealed this
Twenty-first Day of October, 2014

Michelle K. Lee
*Deputy Director of the United States Patent and Trademark Office*